United States Patent [19]

Zdzislaw

[11] Patent Number: 4,748,871

[45] Date of Patent: Jun. 7, 1988

[54] STRIPPING TOOL

[76] Inventor: Bieganski Zdzislaw, 'Brushwood', Kinsbourne, Harpenden, Herts, England

[21] Appl. No.: 3,486

[22] Filed: Jan. 15, 1987

[30] Foreign Application Priority Data

Jan. 24, 1986 [GB] United Kingdom ................ 8601765

[51] Int. Cl.$^4$ .............................................. H02G 1/12
[52] U.S. Cl. .......................................... 81/9.4; 30/90.1
[58] Field of Search ...................... 81/9.4, 9.44; 30/90.1

[56] References Cited

U.S. PATENT DOCUMENTS 4,059,892 11/1977 Siden ..................................... 30/90.1

FOREIGN PATENT DOCUMENTS 1037366 8/1983 U.S.S.R. ................................... 81/9.4

Primary Examiner—Roscoe V. Parker
Attorney, Agent, or Firm—C. O. Marshall, Jr.

[57] ABSTRACT

A stripping tool particularly for fibre optic cables has flexible and resilient jaws carrying blades to contact the conductor, and when excess pressure is applied to close the blades on the conductor, the jaws can flex. This minimizes the risk of conductor damage and further, allows particularly high loading per unit area to be achieved when the blades tilt so that only the heel of each blade contacts the conductor.

5 Claims, 1 Drawing Sheet

U.S. Patent      Jun. 7, 1988      4,748,871
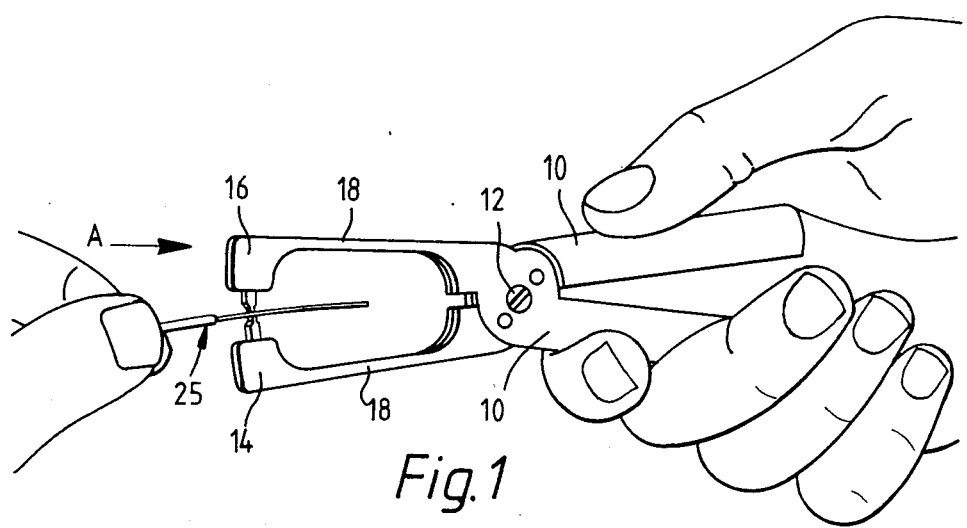
Fig.1
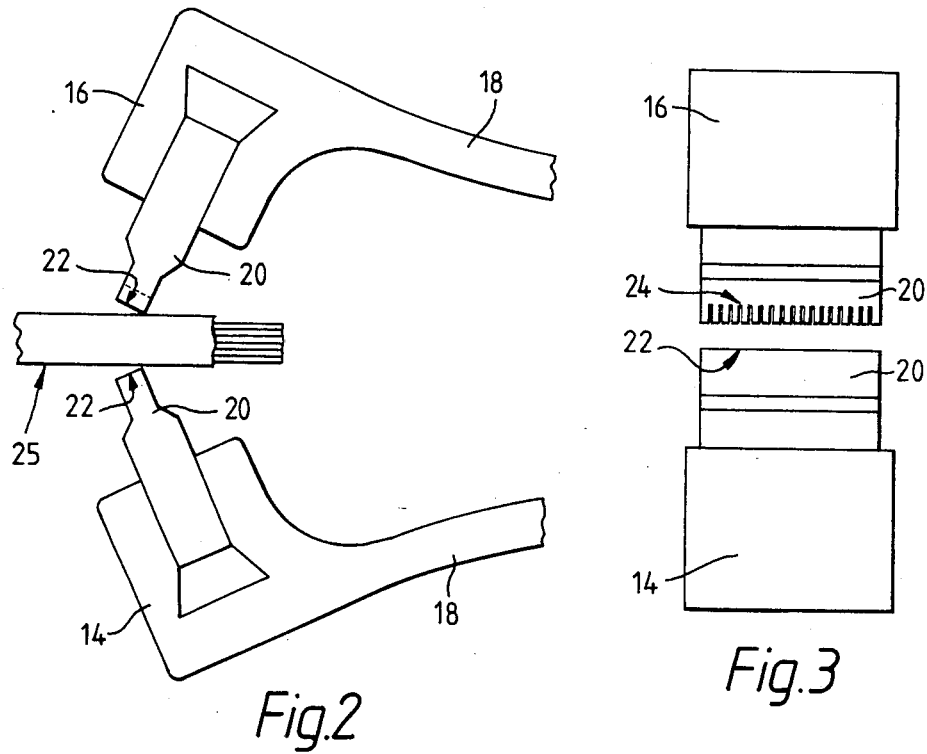
Fig.2
Fig.3

STRIPPING TOOL

This invention relates to a stripping tool for removing a sheath or covering from a conductor, and of the kind comprising a pair of jaws and means for closing the jaws together with the sheathed conductor therebetween, so that the jaws can sever the sheath, when relative movement between tool and conductor will cause the sheath to be stripped from the severed point onwards.

The object of the invention is to provide such a tool which is suitable for use with fibre optic conductors where the sheath is thin and fragile for example a silicon coating possibly of less than 0.025 mm thickness, and where the fibres themselves are easily damaged.

In accordance with the invention a tool of the kind referred to comprises a pair of jaws pivoted together at one end, adapted for contact with the conductor at the other end, and being resilient and flexible between their ends so that after the jaws have been closed together onto a conductor, additional closing pressure flexes the jaws. This itself can contribute to avoiding damage to fragile conductors which should not be gripped too firmly, and has additional advantages in combination with other features of the invention as mentioned below.

In accordance with an important feature of the invention, each jaw is of reduced thickness adjacent the other jaw, and conductor contacting blades project from the jaws towards one another, the said blades including faces which are parallel with one another and with the conductor axis when the jaws are (first) closed onto the conductor. Then, when the jaws are flexed by additional load, the said faces tilt so that only the edges or heels of the faces contact the conductor, and this increases the loading per unit area. In practice it is found by applying gentle pressure to the jaws with slight axial pressure tending to displace the tool relative to the conductor in the stripping direction, the blades will tilt with accompanying increase in pressure applied until such time as the sheath is severed when relative movement will occur of the tool along the conductor. The tool is thus effectively self adjusting for the sheath characteristics; a sheath which severs easily will do so under light pressure before the jaws have flexed very far, but one which is tougher will require greater pressure and flexing. Hence stripping can be accomplished with little or no risk of conductor damage.

According to a further and preferred feature of the invention, one blade has a series of parallel fine slits opening from its conductor contacting face, and is made of a resilient and deformable material such as a hard plastics for two purposes: firstly to avoid risk of the blade damaging the conductor, and this avoidance is because the blade material is then softer than the optic fibre; and secondly to allow the fibres to enter the slits when the sheath is stripped so that the conductor is retained "in" the jaws even when relatively long lengths are to be stripped. The slit blade has an extra freedom to deform laterally of the cable because of the slits. In other words the slits can open to admit the fibre.

One embodiment of the invention is more particularly described with reference to the accompanying drawings in which:

FIG. 1 shows a tool in use;

FIG. 2 is an enlarged fragmentary and somewhat exaggerated view showing the flexing; and FIG. 3 is an equally enlarged end view taken in the direction of the arrow A of FIG. 1.

The tool shown in FIG. 1 is a pliers like tool comprising two like components each providing an operating lever handle 10 which extends across a pivot 12 to form a jaw. Each is made of a suitable relatively flexible and slightly resilient plastics material. The handle portion may be of "U" section to make them stiff and rigid as may each end 14, 16 of the jaws. Between the ends at 18 the structure is of reduced thickness to be flexible. A blade 20 is located in each end 14,16 of the jaws.

The blades 20 may be interchangeable for replacement after wear. Each blade has an end face 22 parallel to the axis of the sheathed conductor 25 as seen in FIG. 1 when the blades first contact the conductor. The flexing, causing only the heels of the blades to contact the conductor for removal of its sheath is shown in FIG. 2 in exaggerated fashion in the interests of a better understanding of the invention in this aspect.

One blade has parallel slits 24 as best seen in FIG. 3.

Having now described my invention, what I claim is:

1. A stripping tool for removing a sheath primarily from a fibre optic conductor comprising two like components pivoted together between their ends so as to provide a pair of lever handles on one side of the pivot and a pair of jaws on the other side of the pivot; the lever handles being stiff and rigid, and the jaws being stiff and rigid at their free ends remote from the pivot; the jaws being flexible and resilient between said stiff and rigid ends and the pivot, and each jaw being provided with a blade, said blades including flat faces which are parallel to one another when the jaws are in a first closed position, and one of the blades having a series of parallel fine slits opening from the said flat face and extending longitudinally of the tool.

2. A tool as claimed in claim 1 wherein each jaw is of reduced thickness between its ends to provide the flexible portion.

3. A tool as claimed in claim 1 wherein said conductor contacting blades project from the jaws towards one another.

4. A tool as claimed in claim 3 wherein the blades are profiled to provide a square edge or heel which contacts the conductor when the jaws flex.

5. A tool as claimed in claim 3 wherein said at least one blade is made of a hard but resilient and deformable material.

* * * * *